United States Patent Office
3,848,021
Patented Nov. 12, 1974

3,848,021
THERMOPLASTIC MOLDING COMPOSITION ON THE BASIS OF POLY(OXYMETHYLENES)
Gunter Sextro, Naurod, Taunus, and Karlheinz Burg, Langenhain, Taunus, Germany, assignors to Farbwerke Hoechst Aktiengesellschaft vormals Meister Lucius & Bruning, Frankfurt am Main, Germany
No Drawing. Filed Aug. 22, 1972, Ser. No. 282,720
Claims priority, application Germany, Aug. 23, 1971, P 21 42 091.7
Int. Cl. C08g 37/02
U.S. Cl. 260—823    10 Claims

ABSTRACT OF THE DISCLOSURE

The crystallization speed of poly(oxymethylenes) may be increased by addition of nucleating agents; suitable nucleating agents are certain inorganic and organic compounds. Especially suitable as organic nucleating agents are poly(oxymethylenes) which contain polyether segments in the macromolecule. Molding compositions on the basis of poly(oxymethylenes) which contain poly(oxymethylenes) modified with polyethers as nucleating agent are used for the manufacture of all kinds of shaped articles.

---

The present invention relates to a thermoplastic molding composition on the basis of poly(oxymethylenes).

It is known that polyacetals (polyoxymethylenes POM) have a strong tendency to crystallize. Even if the melt is under-cooled to a small extent only, a rapid growth of spherulites is observed which, in most cases, are much larger than the length of light waves and confer upon the material a considerable opacity. Moreover, owing to the crystallization process a great number of microscopically small fissures and internal tensions are formed in the interior and on the surface of the material. These fissures and internal tensions detrimentally affect the mechanical properties of shaped articles, for example injection molded articles, made from poly(oxymethylenes). The aforesaid flaws are the more pronounced the larger the individual spherulites.

It is also known that by adding talc to poly(oxymethylenes) of high molecular weight and uniformly distributing the said inorganic nucleating agent in the organic polymer, the crystal structure of injection molded articles can be rendered more uniform and hence a structure of coarse spherulites can be transformed into a homogeneous structure in which the spherulites have a reduced diameter (cf. British Pat. No. 1,133,490).

Furthermore it is known that the size of the spherulites of poly(oxymethylenes) may be reduced by mixing the poly(oxymethylenes), before melting them, with certain organic nucleating agents which, in the poly(oxymethylene) melt, are insoluble or soluble to a small extent only, for example imidazole or pyrazine derivatives containing hydroxy groups (cf. British Pat. No. 1,193,708).

The subject of the present invention is a thermoplastic molding composition on the basis of poly(oxymethylenes), substantially consisting of a mixture of (a) from 99.9 to 80 weight percent of a linear poly(oxymethylene), optionally containing up to 20 weight percent, relative to the said poly(oxymethylene), of oxyalkylene groups having from 2 to 8 adjacent carbon atoms, and (b) from 0.1 to 20 weight percent of a poly(oxymethylene) containing from 0.1 to 30 weight percent, relative to the said poly(oxymethylene), of polyether segments having an average molecular weight (numerical average) of at least 500, and up to 20 weight percent of oxyalkylene groups having from 2 to 8 adjacent carbon atoms.

A further subject of the present invention is a process for the manufacture of a thermoplastic molding composition on the basis of poly(oxymethylenes), which comprises mixing (a) from 99.9 to 80 weight percent of a linear poly(oxymethylene), optionally containing up to 20 weight percent, relative to the said poly(oxymethylene), of oxyalkylene groups having from 2 to 8 adjacent carbon atoms, and (b) from 0.1 to 20 weight percent of a poly(oxymethylene) containing from 0.1 to 30 weight percent, relative to the said poly(oxymethylene), of polyether segments having an average molecular weight (numerical average) of at least 500, and up to 20 weight percent of oxyalkylene groups having from 2 to 8 adjacent carbon atoms, each of the components being in a pulverulent or granulated form, at a temperature below 100° C., and subsequently melting and homogenizing the mixture in a mixing device at a temperature of from 150° C. to 250° C., and then removing it from the mixing device.

Especially suitable are mixtures the linear poly(oxymethylene) of which is a homopolymer of formaldehyde or trioxan or a copolymer of trioxan and a monofunctionally reacting compound copolymerizable with trioxan (hereinafter called POM I), and the polyether segments containing poly(oxymethylene) of which is a copolymer of trioxan and a polyether and optionally a cyclic ether or a cyclic acetal (hereinafter called POM II).

As molding composition of the invention, advantageously a mixture is used which is composed of (a) from 99.9 to 80 weight percent
  (1) of a homopolymer of formaldehyde or trioxan, or
  (2) of a copolymer obtained by polymerizing a mixture of from 99.9 to 80 weight percent of trioxan and from 0.1 to 20 weight percent of a cyclic ether having from 3 to 5 ring members, or a cyclic acetal differing from trioxan having from 5 to 11 ring members, or a linear polyacetal,
and
(b) from 0.1 to 20 weight percent of a copolymer obtained by polymerizing a mixture of from 99.9 to 50 weight percent of trioxan and from 0 to 20 weight percent of a cyclic ether having from 3 to 5 ring members, or a cyclic acetal differing from trioxan having from 5 to 11 ring members, or a linear polyacetal, and from 0.1 to 30 weight percent of a polyether.

The amount of POM I in the molding composition of the invention is advantageously from 99.5 to 90.0 weight percent, while the amount of POM II is advantageously from 0.5 to 10 weight percent. POM I is preferably a copolymer of trioxan and from 1 to 5 weight percent of a comonomer of the above kind, while POM II is preferably a copolymer of trioxan, from 0.5 to 10 weight percent of one of the above cocomponents and from 0.5 to 10 weight percent of a polyether. Especially good properties are displayed by molding composition containing from 99.5 to 95.0 weight percent of POM I and from 0.5 to 5.0 weight percent of POM II.

By homopolymers of formaldehyde or trioxan (POM I) there are to be understood those formaldehyde or trioxan homopolymers the terminal hydroxyl groups of which have been stabilized against degradation by chemical reaction, for example by esterification or etherification.

When trioxan copolymers (POM I) are used, suitable comonomers for trioxan are especially cyclic ethers having from 3 to 5 ring members, preferably epoxides, and cyclic acetals differing from trioxan having from 5 to 11, preferably from 5 to 8, ring members, especially cyclic formals of α,ω-diols having from 2 to 8, preferably from 2 to 4, carbon atoms, the carbon chain of which may be interrupted by an oxygen atom at intervals of 2 carbon atoms, and linear polyacetals, each in an amount of from 0.1 to 20, preferably from 0.5 to 10 weight percent. Most advantageous are copolymers containing from 99 to 95 weight percent of trioxan and from 1 to 5 weight percent of one of the abovementioned cocomponents.

Suitable cyclic ethers are for example ethylene oxide, styrene oxide, propylene oxide, or epichlorhydrin or phenylglycidyl ether. Suitable cyclic acetals are for example glycol formal (1,3-dioxolane), butanediol formal (1,3-dioxepane) or diglycol formal (1,3,6-trioxocane), furthermore 4-chloromethyl-1,3-dioxolane or hexanediol formal (1,3-dioxonane).

As linear polyacetals there may be used homo- or copolymers of the cyclic acetals are defined above, as well as linear condensates of aliphatic or cycloaliphatic α,ω-diols with aliphatic aldehydes or thioaldehydes, preferably formaldehyde. Especially suitable are homopolymers of linear formals of aliphatic α,ω-diols having from 2 to 8, preferably from 2 to 4 carbon atoms.

The POM I polymers have melt indices $i_2$ of from 0.1 to 50 g./10 min., preferably from 1 to 30 g./10 min., measured according to DIN 53 735 at a temperature of 190° C. and a load of 2.16 kg.

By poly(oxymethylenes) containing incorporated polyether segments (POM II), there are to be understood polymers obtained by cationic polymerization of trioxan in the presence of a polyether and, optionally, in the presence of one or more cocomponents. As cocomponents, the same monomer or polymer substances may be used which are mentioned above for the copolymerization with trioxan.

Suitable polyethers are homopolymers of cyclic ethers having from 3 to 5 ring members, preferably epoxides, for example ethylene oxide, propylene oxide, isobutylene oxide, oxacyclobutane, 3,3-bis(chloromethyl)-oxacyclobutane or tetrahydrofuran, or also copolymers of at least 2 of the cited cyclic ethers. The polyethers, depending on the kind of the monomers, are prepared by cationic or anionic polymerization, or by condensation of relatively low molecular weight polyethers having 2 terminal hydroxyl groups per molecule chain to higher molecular weight products (cf. for example German Offenlegungsschrift No. 1,570,540). The molecular weight (numerical average) of these polyethers is at least 500, preferably from 3000 to 100,000, and limited in the upper range by the possibility of its attainment on the one hand, and on the other by the known decrease of solubility of the polyethers in trioxan occurring generally when the molecular weight is increased. The solubility can be influenced by suitable composition of the monomer ethers; thus, polymers containing larger amounts of oxethylene units generally have an improved solubility.

The molecular weight of the polyethers used may be expressed also by the reduced specific viscosity value (RSV value). The polyethers have RSV values above 0.1 dl./g., preferably in the range of from 0.5 to 15 dl./g.; the values being determined at 30° C. on a 0.5 weight percent benzenic solution.

The melt index values $i_2$ of the poly(oxymethylenes) containing polyether segments are in the range of from 0.1 to 50, preferably from 0.2 to 30 g./10 min.; the values being determined according to the method indicated above for POM I.

For the manufacture of the molding compositions in accordance with the present invention, the components, in the form of powders or granules, preferably in the presence of stabilizers against thermal and oxidative degradation, are mixed at a temperature below 100° C., preferably in the range of from 20 to 50° C., and subsequently homogenized in the melt. This homogenization is carried out in any mixing device, for example rollers, calenders, kneaders or extruders, at a temperature above the crystallite melting point of the components, i.e. in the range of from 150° to 250° C., preferably from 170° to 200° C.

The POM I used for the molding composition is prepared in known manner by polymerization of the monomers in the presence of a cationic active catalyst at a temperature of from 0 to 100° C., preferably from 50° to 90° C. (cf. German Auslegeschrift No. 1,420,283). As catalysts, there are used protonic acids, for example perchloric acid, or Lewis acids, for example tin tetrachloride, arsenic pentafluoride, phosphorus pentafluoride or boron trifluoride, or complex or salt-like compounds, for example boron trifluoride etherates, triethyl-oxonium tetrafluoro-borate, triphenylmethyl-hexafluoro-phosphate or acetyl perchlorate. The polymerization may be carried out in bulk, in suspension or in solution. In order to remove unstable portions, the copolymers are advantageously subjected to a controlled thermal or hydrolytic degradation to primary terminal alcohol groups (cf. for example German Auslegeschriften Nos. 1,445,273 and 1,445,294).

The homopolymers of formaldehyde or trioxan used in accordance with the present invention are also prepared in known manner by catalytic polymerization of the monomer (cf. German Auslegeschrift No. 1,037,705 and German Patent No. 1,137,215).

POM II used in accordance with the invention is in principle prepared in the same manner as POM I; however, besides trioxan and, optionally, cocomponents, in the polymerization mixture there are present additionally polyethers in dissolved or dispersed state. Under certain circumstances, it is also possible to operate in the presence of an inert solvent, for example cyclohexane.

Furthermore, it is possible to obtain the incorporation of the polyethers to be used according to the present invention into oxymethylene homopolymers by mixing polyether and poly-(oxymethylene), optionally with the aid of an inert liquid dissolving one or both components, and by reacting the mixture in the presence of cationic catalysts at a temperature of from 0 to 100° C., preferably from 50° to 90° C. Unstable portions may be removed or terminal hydroxy groups may be stabilized in accordance with the method described above.

Obviously, by the presence of poly(oxymethylene) containing polyether segments a nucleation of the molding composition of the invention occurs which results in a decrease of the size of the spherulites and thus in an improvement of the mechanical properties of shaped articles manufactured from the molding composition of the invention. For example, an increased ball indentation hardness as compared to an unmodified poly(oxymethylene) is observed (cf. Table 2). A further result of the nucleation is an increase of the crystallization rate, which permits an increase of the processing speed, which latter increase may result in shortened cycle times of injection molding and in reduced tolerances of injection molded pieces.

The use of poly(oxymethylenes) containing polyether segments in accordance with the present invention as nucleating agent for linear poly(oxymethylenes) is advantageous in that the first mentioned poly(oxymethylenes) may be synthetized as products of uniform quality without requiring a special purification, as is necessary for example when using natural minerals suitable as nucleating agents.

Both the components of the molding composition of the present invention may be mixed with stabilizers against the action of heat, oxygen and light, and subsequently homogenized in the melt. Suitable heat stabilizers are, for example, polyamides, amides of polybasic carboxylic acids, amidines, hydrazines, ureas and poly(N-vinyl-lactams). As oxidation stabilizers phenol, especially bisphenols, and aromatic amines are used and suitable stabilizers against the action of light are derivatives of α-hydroxy-benzophenone and of benzotriazole, the stabilizers being used in an amount of from 0.1 to 10 weight percent, preferably 0.5 to 5 weight percent, calculated on the total mixture.

The molding composition of the invention can be comminuted mechanically, for example by chopping or grinding, into granules, chips, flakes or powders, and processed in the thermoplastic state, for example by injection molding or extrusion, into shaped articles, for example bars, rods, plates, sheets, films, ribbons and tubes.

Preparation of the starting polymers POM I and POM II (a) POM I is prepared according to the abovementioned Specifications, using boron trifluoride as catalyst.
(b) POM II is prepared as follows:

First, a homogeneous mixture of trioxan, ethylene oxide or dioxolane and polyether is prepared at a temperature of from 60° to 110° C. under a nitrogen atmosphere. Depending on the solubility of the polyether, the solution state can be achieved by shaking or stirring or kneading within about 1 minute to about 12 hours. 100 g. each of this mixture are introduced into a polymerization vessel under a nitrogen atmosphere, the thickness of the layer being 0.8 cm., and heated to 70° C. in a bath. After having added from 0.2 to 4.0 ml. of a solution of boron trifluoride-di-n-butyl-etherate in cyclohexane (mixing ratio 1:20, parts by volume) as catalyst, the vessel is shaken thoroughly. After a time of from some seconds to about 10 minutes, the batch solidifies, and is kept for 30 minutes at 70° C. The polymer obtained is cooled to 0° C. and at once ground to fine powder. This powder, in a concentration of 50 g. polymer/1000 ml. solvent in a solution of methanol, water and triethylamine in a volume ratio of 66:34:0.1 is subjected for 30 minutes to degradation in an autoclave under a nitrogen atmosphere and at a temperature of 150° C. Subsequently, the polymer is thoroughly washed with acetone and dried in a nitrogen current at 70° C.

The starting polymers used in accordance with the invention are listed in Table 1.

The following Examples illustrate the invention.

Examples

Pulverulent or granulated POM I and POM II respectively are mixed at room temperature, with simultaneous addition of 0.1 weight percent of dicyanodiamide and 0.5 weight percent of bis(2 - hydroxy-3-tert.-butyl-5-methylphenyl)-methane, each calculated on the total amount of polymers. When granules are employed the stabilizers are advantageously already incorporated before use.

The mixture obtained is homogenized at 200° C. in a single screw extruder, and subsequently granulated. The residence time in the cylinder of the extruder is 4 minutes.

To determine the size of the spherulites in the products obtained films having a thickness of about 10 microns are prepared from the granulated molding composition by melting it at 180° C. between two glass plates with subsequent crystallization at 150° C. under atmospheric pressure, which films are examined under the microscope.

Furthermore, plates having a thickness of 4 mm. are injection molded from the molding composition obtained at a molding temperature of 190° C., and subsequently cooled to 25° C. under pressure. These plates are used for the ball indentation hardness test according to VDE 0302 (load time 10 seconds).

The sizes of the spherulites and the mechanical properties of shaped articles made from molding compositions of the invention are listed in Table 2. For a comparison, the corresponding data of linear poly(oxymethylenes) which have not been nucleated are given (Comparative Examples I, II, III and IV).

Abbreviations

DO=1,3-dioxolane
THF=tetrahydrofuran
EO=ethylene oxide
BCMO=3,3-bis(chloromethyl)-oxacyclo-butane
MW=molecular weight (numerical average)
RSV=reduced specific viscosity

TABLE 1

| Polymer | Composition (kind and amount, weight percent) | | | Melt index (g./10 min.) |
|---|---|---|---|---|
| | Trioxan | Comonomer | Polyether | |
| POM I: | | | | |
| 1 | 98 | 2 EO | | 9 |
| 2 | 98 | 2 EO | | 13 |
| 3 | 98 | 2 EO | | 2.5 |
| 4 | 98 | 2 DO | | 7.5 |
| POM II: | | | | |
| 1 | 96.75 | 2 DO | 1.25 Polyglycol, M.W. 20,000 | 9.7 |
| 2 | 95.5 | 2 DO | 2.5 Polyglycol, M.W. 20,000 | 11.6 |
| 3 | 93 | 2 EO | 5 Polyglycol, M.W. 20,000 | 3.5 |
| 4 | 78 | 2 EO | 20 Polyglycol, M.W. 20,000 | 30.0 |
| 5 | 95.5 | 2 DO | 2.5 THF/EO (9/1), M.W. 3,400 | 1.2 |
| 6 | 93 | 2 DO | 5 THF/EO (9/1), M.W. 3,400 | 0.9 |
| 7 | 88 | 2 DO | 10 THF/EO (9/1), M.W. 3,400 | 0.2 |
| 8 | 93.5 | 4 DO | 2.5 THF/EO (4/1), M.W. 10,000 | 2.2 |
| 9 | 95.5 | 2 EO | 2.5 THF/EO (1/1), RSV 0.53 dl./g | 4.0 |
| 10 | 93.5 | 4 EO | 2.5 THF/BCMO (9/1), M.W. 15,000 | 2.1 |
| 11 | 93 | 2 DO | 5 THF/BCMO (9/1), M.W. 15,000 | 4.9 |
| 12 | 88 | 2 DO | 10 THF/BCMO (9/1), M.W. 15,000 | 13.4 |
| 13 | 90.75 | 8 DO | 1.25 THF/BCMO (9/1), RSV 20 dl./g | 0.9 |
| 14 | 93 | 2 DO | 5 THF/BCMO (3/1), RSV 10 dl./g | 0.7 |
| 15 | 95.5 | 2 DO | 2.5 THF/EO/BCMO (8/1/1), RSV 5.1 dl./g | 0.3 |
| 16 | 93 | 2 DO | 5 THF/EO/BCMO (8/1/1), RSV 5.1 dl./g | 0.6 |
| 17 | 96.75 | 2 DO | 1.25 THF/EO/BMCO (8/1/1), RSV 0.98 dl./g | 2.0 |
| 18 | 95.5 | 2 DO | 2.5 THF/EO/BCMO (8/1/1), RSV 0.98 dl./g | 0.6 |
| 19 | 93 | 2 DO | 5 THF/EO/BCMO (8/1/1), RSV 0.98 dl./g | 0.4 |
| 20 | 95.5 | 2 DO | 2.5 THF/EO/BCMO (8/1/1), RSV 1.52 dl./g | 1.3 |
| 21 | 95.5 | 2 EO | 2.5 THF/EO/BCMO (8/1/1), RSV 1.30 dl./g | 1.1 |
| 22 | 95.5 | 2 DO | 2.5 THF/EO/BCMO (2/1/1), MG 9,000 | 0.7 |

TABLE 2

| Example | POM I, weight percent | POM II, weight percent | | Size of spherulites (micron) | Ball indentation hardness (kg./cm.²) |
|---|---|---|---|---|---|
| I | 100 | I/1 gran | | 500 | 1,465 |
| II | 100 | I/2 gran | | 550 | 1,500 |
| III | 100 | I/3 gran | | 400 | 1,420 |
| IV | 100 | I/4 gran | | 500 | 1,510 |
| 1 | 99 | I/4 powder | 1 II/1 powder | 45 | 1,530 |
| 2 | 99 | I/4 powder | 1 II/2 powder | 30 | 1,540 |
| 3 | 99 | I/4 powder | 1 II/3 powder | 25 | 1,545 |
| 4 | 98.75 | I/1 gran | 1.25 II/4 powder | 50 | 1,495 |

TABLE 2—Continued

| Example | POM I, weight percent | | POM II, weight percent | | Size of spherulites (micron) | Ball indentation hardness (kg./cm.²) |
|---|---|---|---|---|---|---|
| 5 | 99 | I/1 gran | 1 | II/5 powder | 35 | 1,500 |
| 6 | 99 | I/1 gran | 1 | II/6 gran | 25 | 1,510 |
| 7 | 99 | I/1 gran | 1 | II/7 powder | 60 | 1,405 |
| 8 | 99 | I/2 gran | 1 | II/8 powder | 80 | 1,535 |
| 9a | 98.75 | I/1 gran | 1.25 | II/9 powder | 80 | 1,500 |
| 10b | 99.5 | I/1 gran | 0.5 | II/10 gran | 40 | 1,490 |
| 10 | 99 | I/1 gran | 1 | II/10 gran | 25 | 1,495 |
| 10c | 90 | I/1 gran | 10 | II/10 gran | 10 | 1,510 |
| 10d | 80 | I/1 gran | 20 | II/10 gran | 8 | 1,510 |
| 11 | 99 | I/1 gran | 1 | II/11 powder | 35 | 1,495 |
| 12 | 99 | I/1 gran | 1 | II/12 powder | 90 | 1,495 |
| 13 | 99 | I/3 gran | 1 | II/13 powder | 25 | 1,470 |
| 14 | 98.75 | I/1 gran | 1.25 | II/14 gran | 10 | 1,515 |
| 15 | 99 | I/1 gran | 1 | II/15 powder | 22 | 1,510 |
| 16 | 98.75 | I/1 gran | 1.25 | II/16 gran | 25 | 1,525 |
| 17 | 99 | I/1 gran | 1 | II/17 powder | 80 | 1,500 |
| 18 | 99 | I/1 gran | 1 | II/18 powder | 20 | 1,520 |
| 19 | 99 | I/1 gran | 1 | II/19 powder | 20 | 1,525 |
| 20 | 99.4 | I/1 gran | 0.6 | II/20 powder | 80 | 1,495 |
| 21 | 98.75 | I/1 gran | 1.25 | II/21 gran | 80 | 1,495 |
| 22 | 99 | I/3 gran | 1 | II/22 powder | 70 | 1,450 |

What is claimed is:

1. Process for the manufacture of a thermoplastic molding composition on the basis of poly(oxymethylenes), which comprises mixing
   (a) from 99.9 to 80 weight percent of a linear poly(oxymethylene), which may contain up to 20 weight percent, relative to the said poly(oxymethylene), of oxyalkylene groups having from 2 to 8 adjacent carbon atoms, and
   (b) from 0.1 to 20 weight percent of a poly(oxymethylene) containing from 0.1 to 30 weight percent, relative to the said poly(oxymethylene), of polyether segments derived from cyclic ethers having 3 to 5 ring members and having a number average molecular weight of at least 500, and up to 20 weight percent of oxyalkylene groups having from 2 to 8 adjacent carbon atoms,
each of the components being in a pulverulent or granulated form at a temperature below 100° C., and subsequently melting and homogenizing the mixture in a mixing device at a temperature of from 150° to 250° C., and then removing it from the mixing device.

2. A thermoplastic molding composition based on poly(oxymethylenes) consisting essentially of a mixture of
   (a) from 99.9 to 80% by weight of a linear poly(oxymethylene) which may contain up to 20% by weight, relative to the said poly(oxymethylene), of oxyalkylene groups having from 2 to 8 adjacent carbon atoms, and
   (b) from 0.1 to 20% by weight of a poly(oxymethylene) containing from 0.1 to 30% by weight, relative to said poly(oxymethylene), of polyether segments derived from cyclic ethers having 3 to 5 ring members and having a number average molecular weight of at least 500 and up to 20% by weight of oxyalkylene groups having from 2 to 8 adjacent carbon atoms.

3. The thermoplastic molding composition of claim 2 wherein the oxyalkylene groups of component (a) are derived from ethylene oxide.

4. A thermoplastic molding composition according to claim 2 wherein the oxyalkylene groups of component (a) are derived from 1,3-dioxolane.

5. A thermoplastic molding composition according to claim 2 wherein the oxyalkylene groups of component (b) are derived from ethylene oxide.

6. A thermoplastic molding composition according to claim 2 wherein the oxyalkylene groups of component (b) are derived from 1,3-dioxolane.

7. A thermoplastic molding composition according to claim 2 wherein the polyether segments of component (b) are derived from polyethylene glycol.

8. A thermoplastic molding composition according to claim 2 wherein the polyether segments of component (b) are derived from a copolymer of tetrahydrofuran and ethylene oxide.

9. A thermoplastic molding composition according to claim 2 wherein the polyether segments of component (b) are derived from a copolymer of tetrahydrofuran and 3,3-bis(chloromethyl)-oxacyclo-butane.

10. A thermoplastic molding composition according to claim 2 wherein the polyether segment is derived from a copolymer of tetrahydrofuran, ethylene oxide and 3,3-bis(chloromethyl)-oxacyclo-butane.

References Cited
UNITED STATES PATENTS

| 3,704,275 | 11/1972 | Burg et al. | 260—823 |
| 3,631,124 | 12/1971 | Burg et al. | 260—823 |
| 3,346,663 | 10/1967 | Kern et al. | 260—823 |
| 3,639,349 | 2/1972 | Burg et al. | 260—823 |

WILBERT J. BRIGGS, Sr., Primary Examiner

U.S. Cl. X.R.

260—2 A, 67 FP